(12) United States Patent
King

(10) Patent No.: US 8,721,318 B2
(45) Date of Patent: May 13, 2014

(54) SYSTEM FOR MANUFACTURING A ROUGH TEXTURED MOLDED PLASTIC SIDING PRODUCT

(75) Inventor: Daniel W. King, Copley, OH (US)

(73) Assignee: Tapco International Corporation, Wixom, MI (US)

( * ) Notice: Subject to any disclaimer, the term of this patent is extended or adjusted under 35 U.S.C. 154(b) by 244 days.

(21) Appl. No.: 13/188,857

(22) Filed: Jul. 22, 2011

(65) Prior Publication Data

US 2012/0032371 A1  Feb. 9, 2012

Related U.S. Application Data

(60) Provisional application No. 61/366,581, filed on Jul. 22, 2010.

(51) Int. Cl.
  *B29C 59/04* (2006.01)
(52) U.S. Cl.
  USPC ............................. 425/363; 425/373; 425/446
(58) Field of Classification Search
  USPC .................................. 425/363, 367, 373, 446
  See application file for complete search history.

(56) References Cited

U.S. PATENT DOCUMENTS

| | | | | |
|---|---|---|---|---|
| 2,958,909 A | * | 11/1960 | Bradley et al. | 425/363 |
| 3,072,519 A | * | 1/1963 | Salzman | 425/810 |
| 4,211,743 A | * | 7/1980 | Nauta et al. | 425/363 |
| 5,198,242 A | * | 3/1993 | Groeblacher et al. | 425/367 |
| 5,565,056 A | * | 10/1996 | Lause et al. | 264/257 |

* cited by examiner

*Primary Examiner* — James Mackey
(74) *Attorney, Agent, or Firm* — Quinn Law Group, PLLC

(57) ABSTRACT

A system for manufacturing from heated plastic sheet material a molded siding product having a rough-textured surface includes a rotatable backing roll having an elastically deformable rim and an embossing element having a moveable embossing surface in compressive engagement with the backing roll. The circumferential surfaces of the backing roll and embossing surface define a contact patch and a nip point. A rough-textured pattern is impressed onto the heated plastic sheet material moved through the nip point. A supply of cooling liquid at least partially sets the heated plastic sheet material to retain an impression of the rough-textured pattern. Respective first and second guide rollers are located higher than the nip point and create a valley defined by the heated plastic sheet material, such that the cooling liquid is collected in a puddle on the heated plastic material proximate the nip point.

6 Claims, 5 Drawing Sheets

SYSTEM FOR MANUFACTURING A ROUGH TEXTURED MOLDED PLASTIC SIDING PRODUCT

RELATED APPLICATIONS

This patent application claims priority to and all advantages of U.S. Provisional Patent Application No. 61/366,581, filed on Jul. 22, 2010, of which is hereby incorporated by reference in its entirety.

BACKGROUND OF THE INVENTION a. Field of the Invention

The present invention relates to systems and methods for manufacturing molded plastic members, and particularly molded plastic siding products. As used herein, "molded" refers to any suitable process by which the shape or configuration of the plastic product is formed or altered, including, for example, vacuum forming, injection molding, pressing or stamping, casting, extruding, embossing, etc.

b. Description of the Related Art

It is known to extrude or form a sheet or strip of plastics material such as, for example, a vinyl or other thermoplastic material, and then direct the sheet or strip between a pair of rolls to emboss a pattern or surface texture into at least one surface thereof, usually the surface eventually defining an exterior surface of the product. Embossed products manufactured using such a process are typically elongate, and the embossed patterns typically simulate wood grain, natural stone, stucco, etc.

A typical prior method for embossing a pattern in vinyl siding products involves running a hot sheet or strip of plastic received from an extrusion die through a nip roll setup that includes a pair of cooperating rolls. One of the rolls is the embossing roll and has a steel circumferential surface in or on which the reverse image of the desired texture is formed. The other roll is the backing roll, and is normally steel with a heat resistant, hard rubber circumferential coating.

The elongate member while still pliable may be formed or reshaped into a desired configuration (e.g., shaped into an L-shaped or J-shaped cross section) subsequent to being embossed with the exterior surface texture. Further subsequent processing may include snipping, sawing, or punching operations, generally after the material has further stabilized.

The textures imparted to these products by the embossing process may define a surface in the molded part that has variation associated with natural building products such as wood or stone, and may include associated peaks, valleys, grooves, grain, . . . etc. . . . , but these surface features, although discernable and contributing the aesthetics of the product, tend to be generally smooth, rather than substantially rough. This is due to limitations of the embossing systems and processes employed in prior systems and methods for manufacturing molded plastic products of this type. Thus, the roughness of the resulting molded surface can be substantially limited.

Although there are some instances where a molded plastic siding product is desired that has a discernable aesthetic surface pattern or texture which is substantially smooth (e.g., where fine grained wood or smooth stone is being simulated), it would oftentimes be preferable to use siding products having a substantially rougher surface texture than that which can be had in molded plastic siding products embossed using prior manufacturing systems and processes. That is, a molded plastic siding product having a surface texture that is substantially rougher vis-à-vis prior such products is desirable in some instances. Such comparatively rougher-surfaced molded plastic products may better simulate the appearance of, for example, natural building elements such as natural stone or rough-hewn wood.

SUMMARY OF THE INVENTION

The present invention provides a system for manufacturing from heated plastic sheet material a molded siding product having a rough-textured surface, including a rotatable backing roll having a first axis of rotation and an elastically deformable rim defining a circumferential surface, and an embossing element having a moveable embossing surface in compressive engagement with the backing roll, the embossing surface defining a rough-textured pattern. The circumferential surface of the backing roll and the embossing surface define a contact patch therebetween that defines a nip point. The rough-textured pattern is impressed into the circumferential surface of the backing roll, and is capable of being impressed into the circumferential surface of the backing roll in the contact patch through heated plastic sheet material moved through the nip point. A supply of cooling liquid is provided to the nip point, and at least one of the backing roll and the embossing element being cooled thereby. The supply of cooling liquid is sufficient to partially set heated plastic sheet material moved through the nip point and retain therein an impression of the rough-textured pattern and retain sufficient pliability for further plastic forming of the material downstream of the nip point.

The present invention also provides a method for manufacturing from heated plastic sheet material a molded siding product having a rough-textured surface, the method comprising the steps of: compressively engaging an embossing element having an embossing surface defining a rough-textured pattern, and a backing roll; elastically deflecting a soft rim of the backing roll and forming a contact patch between the embossing element and the backing roll with a nip point between the backing roll and embossing element being defined by the contact patch; directing heated plastic sheet material through the nip point; impressing the rough-textured pattern into the rim of the backing roll in the contact patch through the heated plastic sheet material while moving the material though the nip point; and sufficiently cooling the heated plastic material to partially set the heated plastic sheet material moved through the nip point and retain therein an impression of the rough-textured pattern and retain sufficient pliability for further plastic forming of the material downstream of the nip point.

The present invention thus provides systems and methods for manufacturing a rough-textured molded plastic siding product that addresses the limitations of the prior art.

BRIEF DESCRIPTION OF THE DRAWINGS

Advantages of the present invention will be readily appreciated as the same becomes better understood by reference to the following detailed description when considered in connection with the accompanying drawings, wherein.

Figure 1:
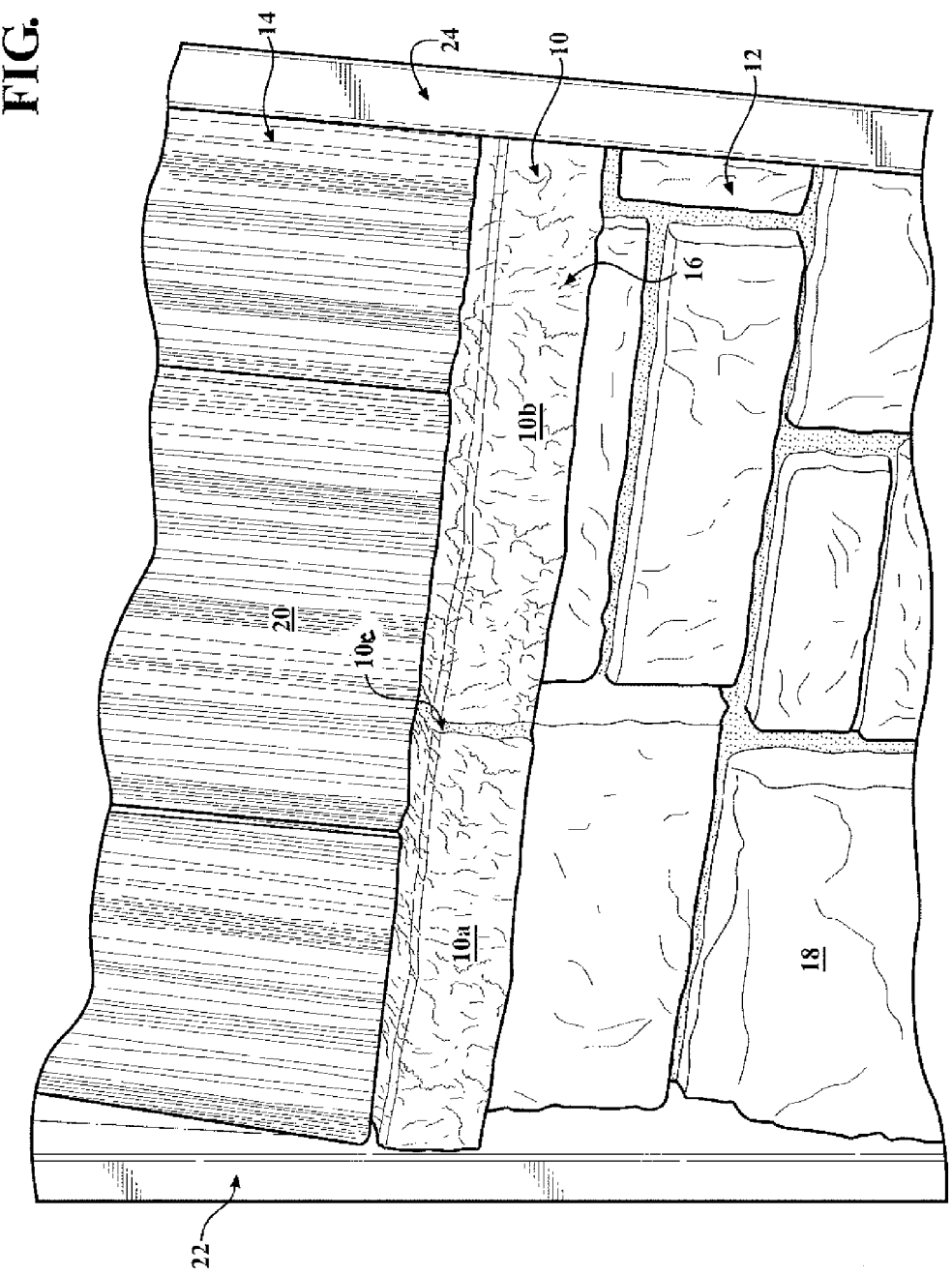
FIG. 1 is an exterior view of a portion of a siding-clad wall having a first lower portion having siding of a first design, and a second upper portion having siding of a different, second design, and a rough-textured molded plastic transition lineal member resulting from the inventive system(s) and method(s) disposed therebetween.

The following description of the preferred embodiment(s) is merely exemplary in nature and is in no way intended to limit the invention, or its uses. It is to be noted that the figures are not necessarily drawn to scale. In particular, the scale of some of the elements of the figures may be exaggerated to emphasize characteristics of the elements. It is also noted that the figures are not necessarily drawn to the same scale. Elements shown in more than one figure that may be similarly configured have been indicated using the same reference numerals.

The invention is susceptible to various modifications and alternative forms. Specific embodiments thereof are shown by way of example in the drawings and may herein be described in detail, and it should be understood that the drawings and detailed description are not intended to limit the invention to the particular form(s) disclosed, but on the contrary, the intention is to cover all modifications, equivalents and alternatives falling within the spirit and scope of the present invention as defined by the appended claims.

DETAILED DESCRIPTION OF EXEMPLARY EMBODIMENT(S)

FIG. 1 provides an exterior, perspective view of a rough-textured molded plastic siding product 10 in the form of a transition lineal. The shown, elongate transition lineal 10 is installed on the exterior wall of a dwelling between a first molded plastic siding panel 12 simulating the appearance of a natural stone wall, and a second molded plastic siding panel 14 simulating the appearance of an arrangement of cedar shakes. Lineal 10 is elongate and extends horizontally between panels 12 and 14 to improve the appearance of the transition between them. Transition lineal 10 has an exterior surface 16 that is of appreciably rougher texture than the respective exterior surface 18, 20 of either panel 12 or panel 14. As shown, transition lineal 10 and panels 12, 14 extend between a pair of elongate, vertically-oriented vinyl members 22, 24 embossed with a wood grain pattern according to a prior art method.

Transition lineal 10, which may also be vinyl, simulates the appearance of a plurality of rough-surfaced natural stone building elements 10a, 10b placed end-to-end with a simulated mortared joint 10c therebetween. Unlike prior molded plastic transition lineals, which typically have a surface smoothness similar to that of embossed vertical members 22, 24, lineal 10 has a substantially rougher texture. Prior methods of embossing a vinyl lineal and siding panels results in a surface texture smoothness as seen on the elongate vertical members 22, 24 on each side of the wall in FIG. 1.

A rough-textured molded plastic product such as transition lineal 10 is manufactured from a sheet or strip of plastic material 40 according to the following described system(s) and method(s).

Figure 2:
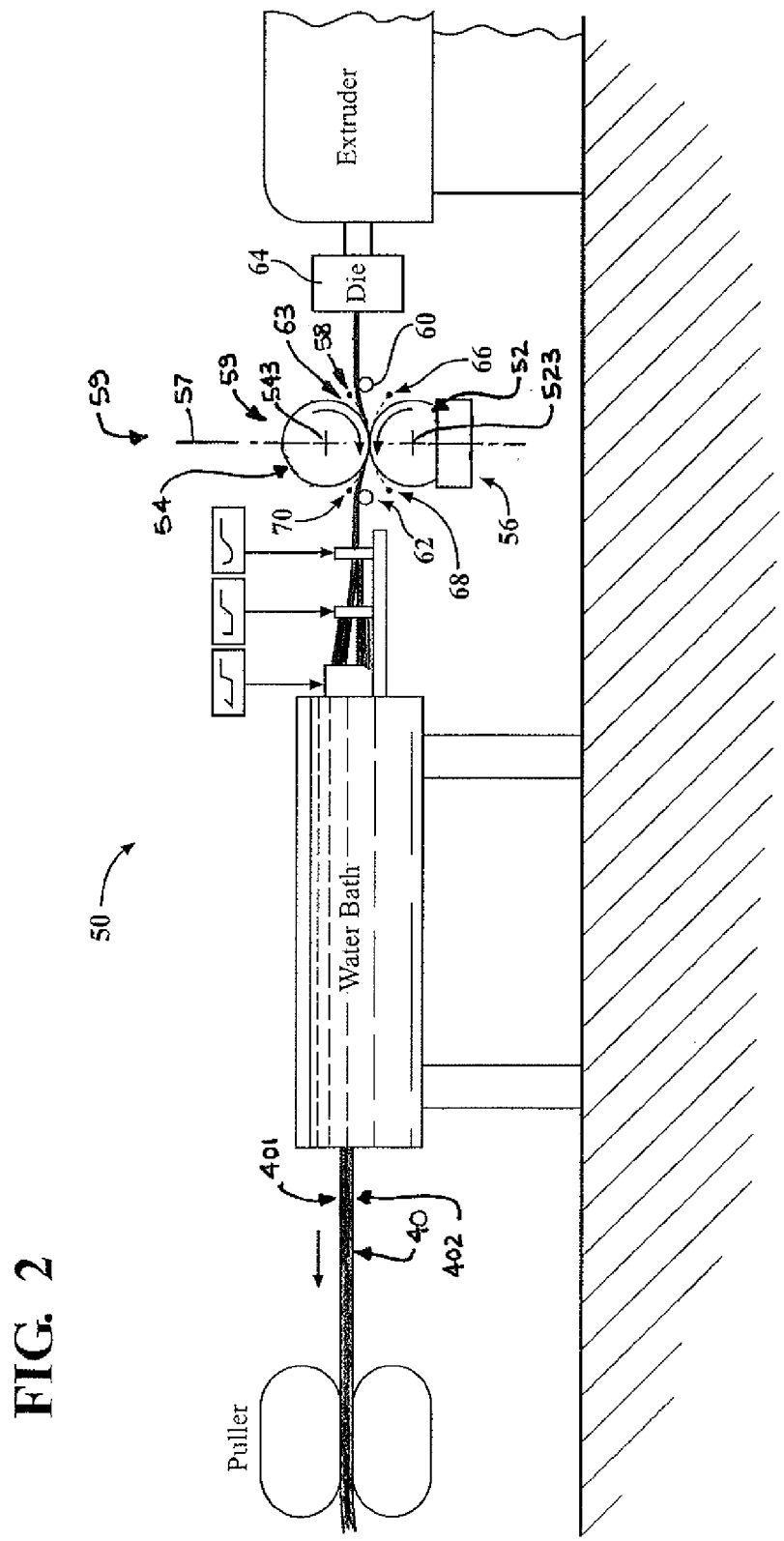
FIG. 2 is a schematic representation of a first embodiment manufacturing system.

Referring to FIG. 2, first embodiment manufacturing system 50 for manufacturing a rough-textured molded plastic product, such as lineal 10, includes the schematically shown portion of its extrusion production line. Except as noted herein, system 50 is generally of a known type.

To achieve the rougher, deeper surface texture of lineal 10, manufacturing system 50 includes an embossing element in the form of embossing roll 52 with a deeper than typical relief texture 521 in its steel circumferential embossing surface 522, and a backing roll 54 having a cylindrical coating or rim 541 formed of a soft rubber, such as silicone, that defines its circumferential surface 542. Coating 541 is elastically deformable and much softer than the typical heat resistant hard rubber typically used in prior backing rolls for vinyl lineal embossing processes, and has a radial thickness of approximately one inch. Rolls 52 and 54 are rotatable about their respective, parallel axes of rotation 523 and 543. The relief texture characteristics, dimensions, and materials of rolls 52, 54 are otherwise similar to prior embossing and backing rolls.

Figure 3:
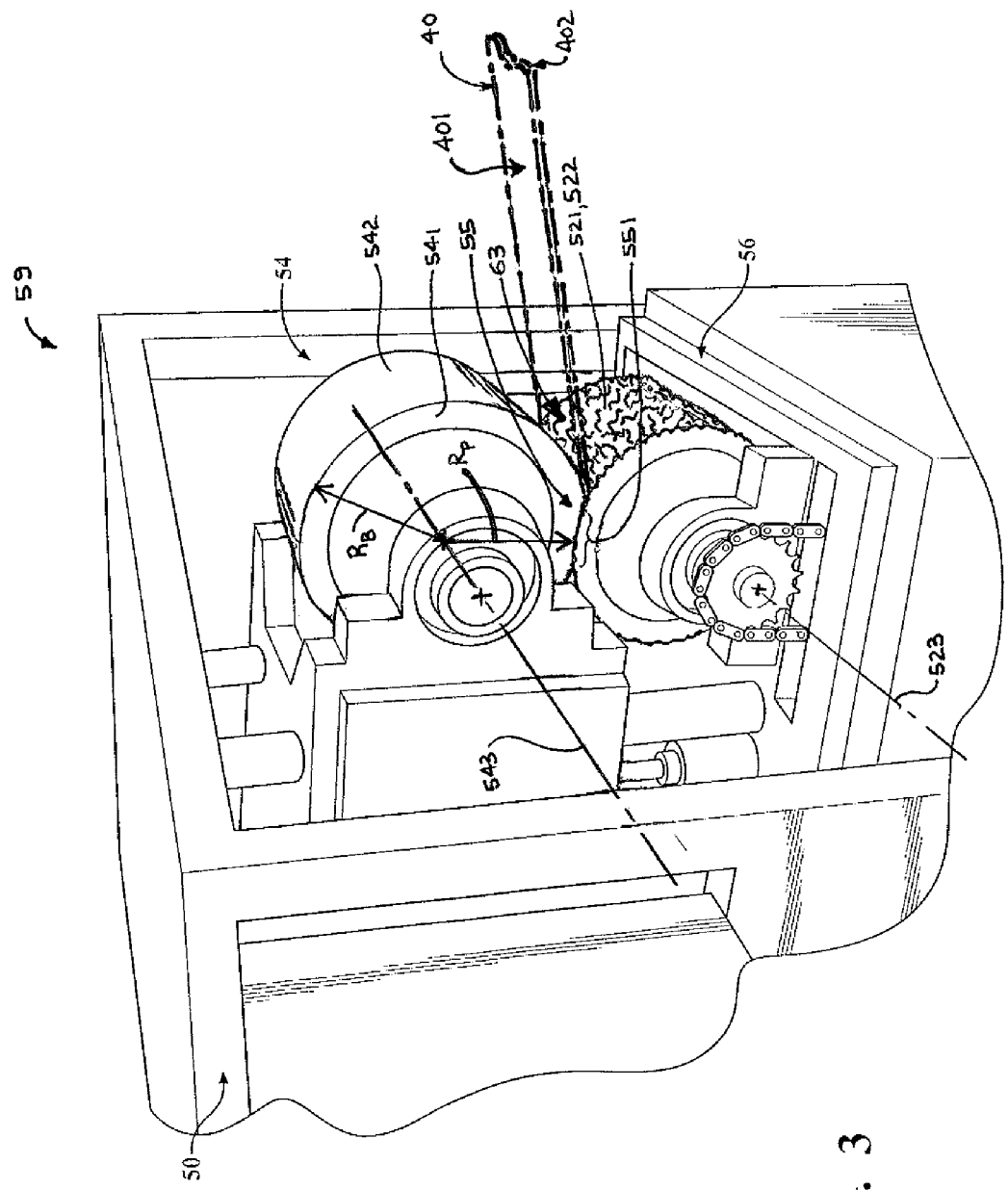
FIG. 3 is a partial perspective view of the embossing stand of the manufacturing system of FIG. 2, showing its embossing and backing rolls and the water bath in which the embossing roll is partially immersed, a sheet of material being processed by the system shown in phantom lines.

FIG. 3 shows a portion of the embossing stand 59 of the first embodiment manufacturing system 50 at which rolls 52, 54 are located. Steel rimmed, deeply textured embossing roll 52 is shown mounted in the lower roll position, and soft silicone-coated backing roll 54 is shown mounted in the upper roll position. The embossing roll 52 and backing roll 54 are in compressive engagement, and the lower portion of the embossing roll 52 is disposed in tray or tank 56 containing cooling water, the roll 52 partially immersed in the water bath. During the manufacturing operation, the bottommost portion of rotating embossing roll 52 moves through the water bath, and as it does the water in tray 56 forms a film of water that is carried on rough-textured circumferential embossing surface 522 of roll 52. The film of water travels with the circumferential surface 522 of the rotating embossing roll up to the nip point 55 between the rolls 52, 54.

The position of the soft rubber-coated backing roll 54 is adjusted vertically relative to embossing roll 52 to bring its soft rubber rim 541 into compression the steel circumferential surface 522 of embossing roll 52 at nip point 55. Since the silicone rubber coating 541 on roll 54 is soft, the pressure applied to it by roll 52 elastically deflects or deforms the coating 541 locally, and creates a large contact patch 551 on the circumferences 522, 542 of the embossing roll 52 and the backing roll 54, the nip point 55 between rolls 52 and 54 defined by the circumferences 522, 542 in contact patch 551. Because of the softness of rim 541, and its substantial radial thickness, at a given force level the contact patch 551 is substantially larger than that which can be produced by the relatively hard rubber backing rolls used in prior art methods.

The elastic deformation of the silicone coating 541 of backing roll 54, which forms the contact patch 551, remains located between the parallel axes of rotation 523, 543 of the rolls 52, 54, and the contact patch 551 moves relative to the circumferential surfaces 522, 542 of the rolls 52, 54 as they rotate about their respective axes. Those of ordinary skill in the art will recognize that the deformation in the silicone coating 541 of backing roll 54 which forms the contact patch 551, moves along and relative to the circumference 542 of the backing roll 54 as it rotates about axis 543 during operation of system 50.

At the contact patch 551, the deflected silicone rubber coating 541 of backing roll 54 looks somewhat like the lower portion of a partially deflated car tire. During operation of system 50, the behavior of the contact patch 551 is similar to such a tire rolling down a road, the locus of the deflection in the contact patch 551 moving circumferentially about and relative to the rotating backing roll 54, and remaining between axes 523 and 543. The nip point 55 between rolls 52 and 54 is therefore wide, as viewed along roll axes of rotation 523, 543, and extends well beyond both sides of a substantially vertical imaginary plane 57 containing parallel axes 523 and 543.

The force between rolls 52, 54 that results in formation of the contact patch 551 is transferred between circumferential surfaces 522, 542 in the contact patch 551 through the plastic material 40, embossing it as the material is moved between rolls 52 and 54, the deeply formed relief texture 521 that defines the embossing roll circumferential surface 522 impressed into the material 40 and the silicone coating 541 of the backing roll 54.

Rolls 52 and 54 rotate about their respective axes 523, 543 in opposite angular directions, and each may be separately rotatably driven about its axis. Alternatively, only the embossing roll is driven about its axis. Further, the angular speeds at which rolls 52 and 54 are rotated about their respective axes 523, 543 may be relatively adjusted such that there is no slippage between the circumferences 522, 542 of the rolls 52, 54 relative to each other, or between either roll circumference 522, 542 and the plastic sheet material 40 disposed therebetween, in contact patch 551.

The cylindrical backing roll's circumference 542, in its natural, undeformed state, lies at radius $R_B$ from axis 543. Those of ordinary skill in the art will recognize that, at a given rotational speed of backing roll 54 about axis 543, the tangential speed of its deformed circumference 542 in the contact patch 551 will vary with the radial distances $R_P$ from axis 543 to different locations on circumference 542 in the contact patch 551. Once contact patch 551 is established by compressive engagement between rolls 52, 54, radius $R_P$ from axis 543 to circumferentially different points in the contact patch may vary, but in imaginary plane 57 will be less than circumferential radius $R_B$ from axis 543 to the undeformed circumference 542. Thus, depending on the amount of deflection imparted to the silicone rubber rim 541 of roll 54, which will vary along the circumference of embossing roll 52 in the contact patch 551, it is preferable that the rotational speed of at least one of rolls 52, 54 be altered to prevent substantial slippage therebetween, or between either roll 52, 54 relative to the plastic material 40 processed between the rolls in the contact patch 551 during operation of system 50.

The water bath held by tray 56 for textured steel embossing roll 52, the lower portion of which is immersed in the bath, cools embossing roll 52 and keeps its embossing circumferential surface 522 wet. Thus, the hot plastic sheet 40 passing through the nip point 55 is cooled by the bath water carried on the surface 522 of embossing roll 52. The material 40 is also cooled by water sprayed on it by a water mister 58 located upstream of the nip point 55, the sprayed water being directed into the nip point 55 from above the material 40 as seen in FIG. 2, i.e., between the rubber-coated backing roll 54 and the top surface 401 of the hot plastic material 40. The circumferential surfaces 522, 542 of embossing roll 52 and backing roll 54 are thus respectively kept cool and wet by the bath water and by cooling water sprayed from mister 58.

System 50 includes guide rollers 60, 62 respectively positioned upstream and downstream relative to the nip point 55 and the direction in which material 40 moves as it travels through system 50. As shown in FIG. 2, the plastic sheet 40 exits the extruder die 64 and is extended over the circumferentially uppermost portion of upstream guide roller 60. From guide roller 60, the sheet is directed downwardly to the nip point 55 between rolls 52, 54, wherein it is embossed in the contact patch 551. As the sheet 40 exits the nip point 55, it is directed upwardly to downstream guide roller 62, and is extended over the circumferentially uppermost portion thereof. The guide rollers 60, 62 are arranged such that the uppermost portions of their circumferences are vertically higher than the nip point 55. In other words, the hot plastic sheet 40 moves downwardly from upstream guide roller 60 into a valley in which the nip point 55 is located, and then upwardly from the nip point 55 valley toward downstream guide roller 62. This arrangement facilitates formation of a puddle 63 of the cooling water sprayed from mister 58 on the top surface 401 of the material sheet 40 proximate the nip point 55 between rolls 52 and 54. The cooling provided by the sprayed water, the water collected in the puddle 63, and the bath water carried to the nip point 55 by the embossing roll 52, helps the heated material 40 to cool sufficiently to partially set quickly, thereby locking in the embossed rough surface texture pattern 16 pressed into it, which corresponds to the embossing roll relief texture 521. Yet, material 40, though somewhat cooled, still remains hot and pliable enough to be pulled through tooling of system 50 located downstream of embossing stand 59 and which plastically forms the desired shape(s) or cross sectional configuration(s) of the embossed material sheet 40.

In addition to water mister 58 discussed above, system 50 may include water misters 66, 68, 70, with all four misters preferably arranged to direct their sprays of cooling water towards the nip point 55, and onto their respective roll 52, 54 and the associated top or bottom surface 401, 402 of the hot plastic sheet 40, upstream and downstream of the nip point 55. Water sprayed by mister 70, located downstream of the nip point 551 above material 40, is directed onto the material top surface 401 and the backing roll 54, and collects in the nip point valley, thereby contributing to the formation of the cooling water puddle 63 on top surface 401 of material 40.

Figure 4:
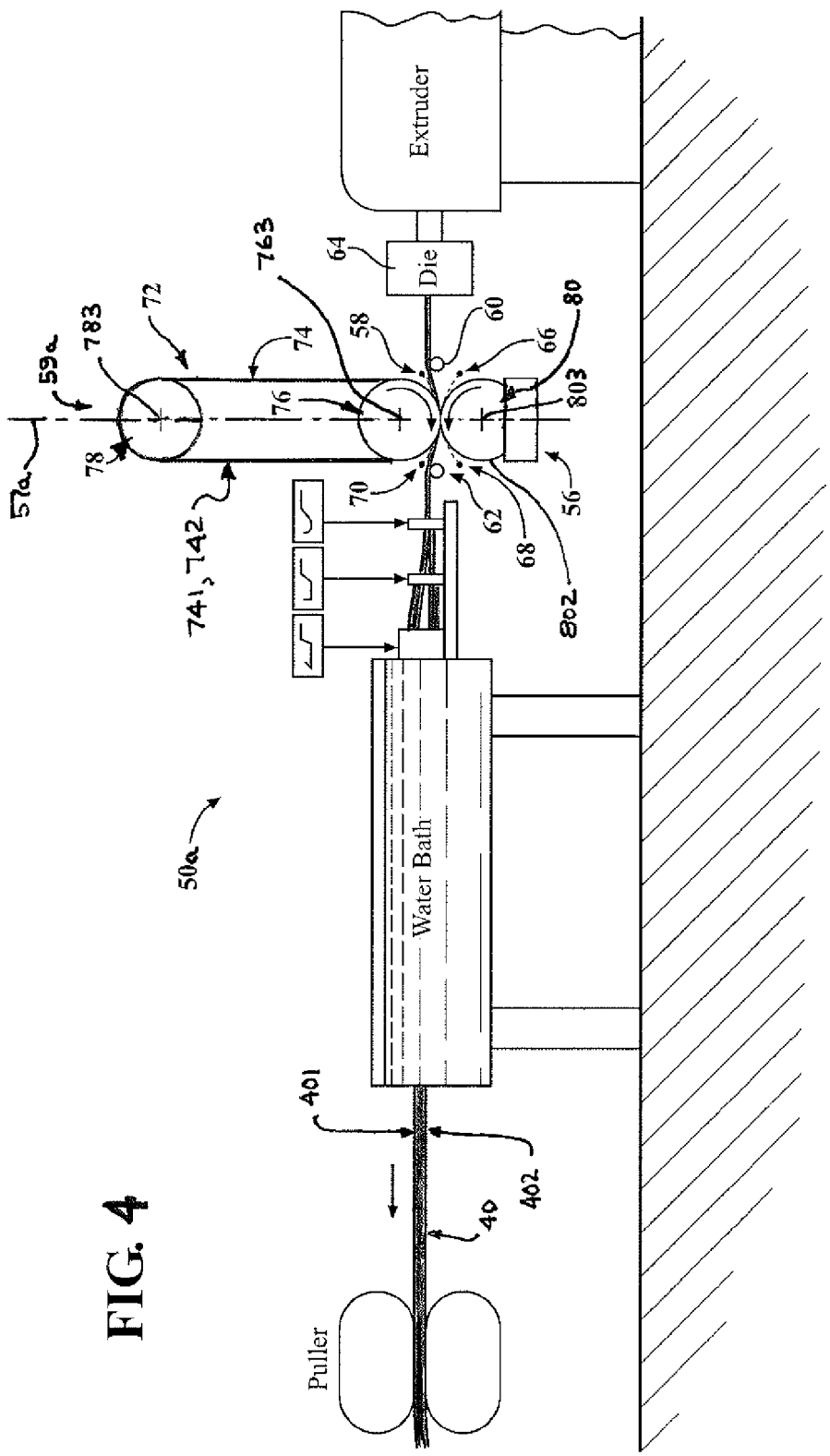
FIG. 4 is a schematic representation of a second embodiment manufacturing system.

Referring to FIG. 4, second embodiment system 50a is substantially identical in function and structure to first embodiment system 50, except that instead of embossing stand 59 which includes rolls 52, 54, it includes embossing stand 59a having embossing belt assembly 72, and a backing roll 80 that is partially immersed in the water bath in tray 56 and which carries a film of the water from the bath to the nip point.

Embossing belt assembly 72 includes endless, flexible embossing belt 74 having a deeper than typical relief texture 741 provided in its outer surface 742, and lower and upper belt rollers 76, 78 over which belt 74 is extended, and through which rollers 76 and 78 are rotatably coupled. Either of belt rollers 76, 78 may be rotatably driven about its respective axis of rotation 763, 783. Axes 763 and 783 are parallel and vertically spaced.

In second embodiment manufacturing system 50a and embossing stand 59a, embossing belt assembly 72 is used instead of the steel embossing roll 52 of first embodiment system 50 and stand 59, with lower belt roller 76 disposed in the above-mentioned upper roll location of first embodiment system 50 and stand 59. In second embodiment system 50a and its embossing stand 59a, backing roll 80 is used instead of backing roll 54 of first embodiment system 50 and stand 59, and is disposed in the above-mentioned upper roll location of first embodiment system 50 and stand 59. Backing roll 80 may, however, be substantially identical to backing roll 54. Thus, in second embodiment system 50a and its embossing stand 59a, the soft silicone rubber-rimmed backing roll 80 is positioned beneath embossing belt assembly 72, with the parallel axes of rotation 763, 783, and 803 of belt rollers 76 and 78, and backing roll 80 all contained in substantially vertical imaginary plane 57a. The nip point, which in this embodiment is between the outer surface 742 of belt 74 and the circumference 802 of backing roll 80, is defined by a contact patch that is similar to contact patch 551 (FIG. 3), though inverted, and which extends well beyond both sides of imaginary plane 57*a*.

In second embodiment system 50*a*, backing roll 80 is partially disposed in cooling water bath 56 and, as in first embodiment system 50, system 50*a* includes water misters 58, 66, 68, 70, and guide rollers 60, 62, the uppermost circumferential portions of which are located vertically higher than the nip point. Here, too, the nip point and contact patch are located in a valley defined by material 40, facilitating the formation of a puddle 63 of cooling water on material top surface 401 proximate the nip point.

The axial lengths of belt rollers 76, 78, backing roll 80, and guide rollers 60, 62; the distance between belt roller axes 763, 783; and the width and length of belt 74, may all be made sufficiently large to accommodate molding large plastic products such as molded siding panels. Therefore, in addition to molded parts such as transition lineal 10, panels having rough surface textures could also be produced using second embodiment manufacturing system 50*a*. Multiple such panels, each with different, individual surface textures could also be molded using a single, suitably designed embossing belt 74 of adequate length. So configured, manufacturing system 50*a* may accommodate, with a single embossing belt 74, the production of a plurality of differently configured siding panels that would reduce the repetition of a common surface texture pattern in a plurality of panels installed on a building.

Thus, the second embodiment system 50*a* is capable of molding rough-textured surfaces in large or long parts such as siding panels, with large distances between areas of pattern repeat along the direction of material 40 travel through the system. Such distances between areas of pattern repeat in a part are greater than those attainable through use of a relatively small diameter textured embossing roll such as roll 52 of first embodiment system 50, the textured pattern of which would repeat after each 360° rotation of the embossing roll.

Figure 5:
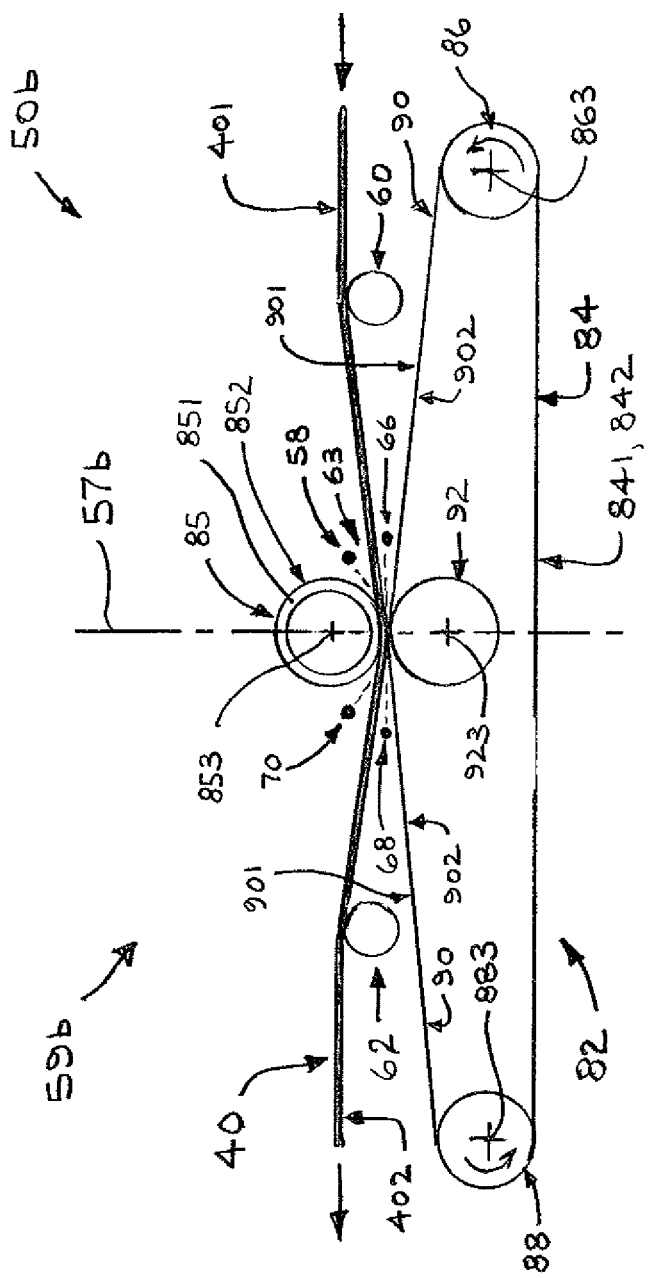
FIG. 5 is a partial schematic representation of a third embodiment manufacturing system, showing its embossing stand.

Embossing stand 59*b* of third embodiment manufacturing system 50*b* is shown in FIG. 5. System 50*b* is substantially identical in function and structure to first embodiment system 50, except that instead of embossing stand 59 which includes steel embossing roll 52 partially immersed in a bath of cooling water held in tank 56, system 56*b* includes embossing stand 59*b* having substantially horizontally oriented embossing belt assembly 82. Embossing stand 59*b* includes backing roll 85 having soft, silicone rubber rim 851, and which may be substantially identical to backing roll 54 or 80 of first or second embodiment embossing stand 59, 59*a*. In third embodiment system 50*b* and embossing stand 59*b*, the soft silicone rubber-rimmed backing roll 85 is positioned above embossing belt assembly 82, in the above-mentioned upper roll position of first embodiment system 50.

Embossing belt assembly 82 includes endless, flexible embossing belt 84 which may be substantially identical to above-described belt 74 of second embodiment system 50*a*, and upstream and downstream belt rollers 86, 88 over which belt 84 is extended, and through which rollers 86 and 88 are rotatably coupled. Like belt 74, belt 84 has a deeper than typical relief texture 841 provided in its outer surface 842. Either of belt rollers 86, 88 may be rotatably driven about its respective axis of rotation 863, 883. Axes of rotation 863 and 883 are parallel and horizontally spaced. The upper span 90 of belt 84 extends over the uppermost circumferential portions of belt rollers 86, 88, and in this embodiment the nip point is located between belt upper span 90 and backing roll 85.

Thus, in third embodiment system 50*b* and embossing stand 59*b*, the soft silicone rubber-rimmed backing roll 85 is positioned above embossing belt assembly 82. Supporting belt upper span 90 against downward movement away from backing roll 85 is belt support roller 92 that bears against the underside 902 of the belt's upper span. Backing roll 85 and the top side 901 of the belt's upper span 90 are in compressed engagement, and bear against each other through the thickness of material 40 in the contact patch.

Belt support roller 92 has an axis of rotation 923 parallel with axes 863 and 883 of belt rollers 86 and 88, and axis 853 of backing roll 85. Axes 853 and 923 are contained within substantially vertical imaginary plane 57*b*. The nip point, which in this embodiment is between the outer surface 842 of belt 84 and the circumference 852 of backing roll 85, is defined by a contact patch that is similar to contact patch 551 (FIG. 3), and extends well beyond both sides of imaginary plane 57*b*.

As in first embodiment system 50, third embodiment system 50*b* includes water misters 58, 66, 68, 70, and guide rollers 60, 62, the uppermost circumferential portions of which are located vertically higher than the nip point. Here, too, the nip point and contact patch are located in a valley defined by material 40, facilitating the formation of a puddle 63 of cooling water on material top surface 401 proximate the nip point.

The axial lengths of belt rollers 86, 88, backing roll 85, and guide rollers 60, 62; the distance between belt roller axes 863, 883; and the width and length of belt 84, may all be made sufficiently large to accommodate molding large plastic products such as molded siding panels. Therefore, in addition to molded parts such as transition lineal 10, panels having rough surface textures could also be produced using third embodiment manufacturing system 50*b*. Multiple such panels, each with different, individual surface textures could also be molded using a single, suitably designed embossing belt 84 of adequate length. So configured, manufacturing system 50*b* may accommodate, with a single embossing belt 84, the production of a plurality of differently configured siding panels that would reduce the repetition of a common surface texture pattern in a plurality of panels installed on a building.

Thus, the third embodiment system 50*b* is capable of molding rough-textured surfaces in large or long parts such as siding panels with large distances between areas of pattern repeat along the direction of material 40 travel through the system. Such distances between areas of pattern repeat in a part are greater than those attainable through use of a relatively small diameter textured embossing roll such as roll 52 of first embodiment system 50, the textured pattern of which would repeat after each 360° rotation of the embossing roll.

With reference again to FIG. 1, in addition to the rough texture of surface 16 formed in lineal 10 by the embossing roll 52, or embossing belt 74 or 84, some areas of the roll 52, or belt 74 or 84, can be made to simulate the mortar line 10*c* between simulated stones 10*a*, 10*b*. Also, some areas of the embossing roll 52 or embossing belt 74 or 84 may be smooth to create places on the surface molded part that are without texture, so one part can be overlapped with one another (e.g., a pair of adjacent lineals 10), without the surface texture of one or both interfering with their overlap.

One of ordinary skill in the art will recognize that the above-described system and method of manufacture can be utilized for the manufacture of many other types of products that simulate building product including rough-textured stone, wood grain, stucco or others.

While the invention has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A system for manufacturing from heated plastic sheet material a molded siding product having a rough-textured surface, said system comprising:

a rotatable backing roll having a first axis of rotation and an elastically deformable rim disposed about said axis of rotation, said rim defining a circumferential surface of said backing roll;

an embossing element having a moveable embossing surface in compressive engagement with said backing roll, said embossing surface defining a rough-textured pattern, said circumferential surface of said backing roll and said embossing surface defining a contact patch therebetween that defines a nip point, said rough-textured pattern impressed into said circumferential surface of said backing roll in said contact patch, said rough-textured pattern capable of being impressed into said circumferential surface of said backing roll in said contact patch through heated plastic sheet material moved through said nip point;

a supply of cooling liquid provided to said nip point, at least one of said backing roll and said embossing element being cooled by said supply of cooling liquid;

wherein said supply of cooling liquid is sufficient to partially set heated plastic sheet material moved through said nip point and retain therein an impression of said rough-textured pattern and retain sufficient pliability for further plastic forming of the material downstream of said nip point; and first and second guide rollers respectively located upstream and downstream of said nip point, said guide rollers each having a circumferentially uppermost portion located higher than said nip point and on which plastic sheet material may be supported as it moves through said system, and wherein said nip point is located in a valley defined by plastic sheet material extending between said circumferentially uppermost portions and said nip point, wherein cooling liquid from said supply of cooling liquid is collected in a puddle on heated plastic material proximate said nip point, whereby said plastic material is cooled by liquid in said puddle.

2. The system of claim 1, wherein said embossing element is a rotatable embossing roll having a second axis of rotation about which said embossing roll has a circumference on which said embossing surface is defined, and further comprising a liquid bath in which said embossing roll is partially immersed, a film of water from said bath carried on said embossing surface toward said nip point.

3. The system of claim 1, wherein said embossing element is an embossing belt assembly comprising an endless embossing belt extended over a pair of belt rollers, said belt having an outer surface defining said embossing surface.

4. The system of claim 3, wherein said belt rollers are vertically spaced.

5. The system of claim 3, wherein said belt rollers are horizontally spaced.

6. The system of claim 5, further comprising a support roller disposed between said belt rollers, said embossing belt supported into compressive engagement with said backing roll by said support roller.

* * * * *